(12) United States Patent
Nagashima et al.

(10) Patent No.: US 12,505,872 B2
(45) Date of Patent: Dec. 23, 2025

(54) APPARATUSES AND METHODS FOR GENERATING CLOCK SIGNALS

(71) Applicant: MICRON TECHNOLOGY, INC., Boise, ID (US)

(72) Inventors: Osamu Nagashima, Kanagawa (JP); Yoshinori Matsui, Kanagawa (JP); Keun Soo Song, Boise, ID (US); Hiroki Takahashi, Tokyo (JP); Shunichi Saito, Kanagawa (JP)

(73) Assignee: MICRON TECHNOLOGY, INC., Boise, ID (US)

( * ) Notice: Subject to any disclaimer, the term of this patent is extended or adjusted under 35 U.S.C. 154(b) by 260 days.

(21) Appl. No.: 18/353,607

(22) Filed: Jul. 17, 2023

(65) Prior Publication Data

US 2024/0038289 A1 Feb. 1, 2024

Related U.S. Application Data

(60) Provisional application No. 63/369,621, filed on Jul. 27, 2022.

(51) Int. Cl.
| | | |
|---|---|---|
| G11C 16/04 | (2006.01) | |
| G11C 11/4076 | (2006.01) | |
| G11C 11/408 | (2006.01) | |
| H03K 5/135 | (2006.01) | |
| H03K 5/00 | (2006.01) | |

(52) U.S. Cl.
CPC ...... *G11C 11/4076* (2013.01); *G11C 11/4087* (2013.01); *H03K 5/135* (2013.01); *H03K 2005/00078* (2013.01)

(58) Field of Classification Search
CPC . G11C 11/4076; G11C 11/4087; H03K 5/135; H03K 2005/00078
See application file for complete search history.

(56) References Cited

U.S. PATENT DOCUMENTS

| | | | | |
|---|---|---|---|---|
| 6,714,438 B2* | 3/2004 | Kawabata | ............ | G11C 7/1078 365/230.06 |
| 11,545,200 B1* | 1/2023 | Wu | ........................ | G11C 7/222 |
| 2021/0183423 A1* | 6/2021 | Yang | ........................ | G11C 8/10 |

* cited by examiner

*Primary Examiner* — Pho M Luu
(74) *Attorney, Agent, or Firm* — Dorsey & Whitney LLP

(57) ABSTRACT

A clock generator circuit may generate internal data clock signals, such as quadrature phase clock signals, based at least in part, on one clock signal responsive, at least in part, to another clock signal. The internal data clock signals may be generated from a system clock signal responsive to a data clock signal. The internal data clock signal may be generated by sampling the system clock signal. The sampling may be performed responsive to the data clock signal. A latch may latch a state of the system clock signal responsive to the data clock signal. The latch may output the internal data clock signal.

21 Claims, 7 Drawing Sheets

APPARATUSES AND METHODS FOR GENERATING CLOCK SIGNALS

CROSS REFERENCE TO RELATED APPLICATION(S)

This application claims the benefit, under 35 U.S.C. § 119(e), of U.S. Provisional Patent Application No. 63/369,621, filed Jul. 27, 2022. The aforementioned application is incorporated herein by reference, in its entirety, for any purpose.

BACKGROUND

Semiconductor memories are used in many electronic systems to store data that may be retrieved at a later time. As the demand has increased for electronic systems to be faster, have greater computing ability, and consume less power, semiconductor memories that may be accessed faster, store more data, and use less power have been continually developed to meet the changing needs. Part of the development includes creating new specifications for controlling and accessing semiconductor memories, with the changes in the specifications from one generation to the next directed to improving performance of the memories in the electronic systems.

DETAILED DESCRIPTION

Figure 1:
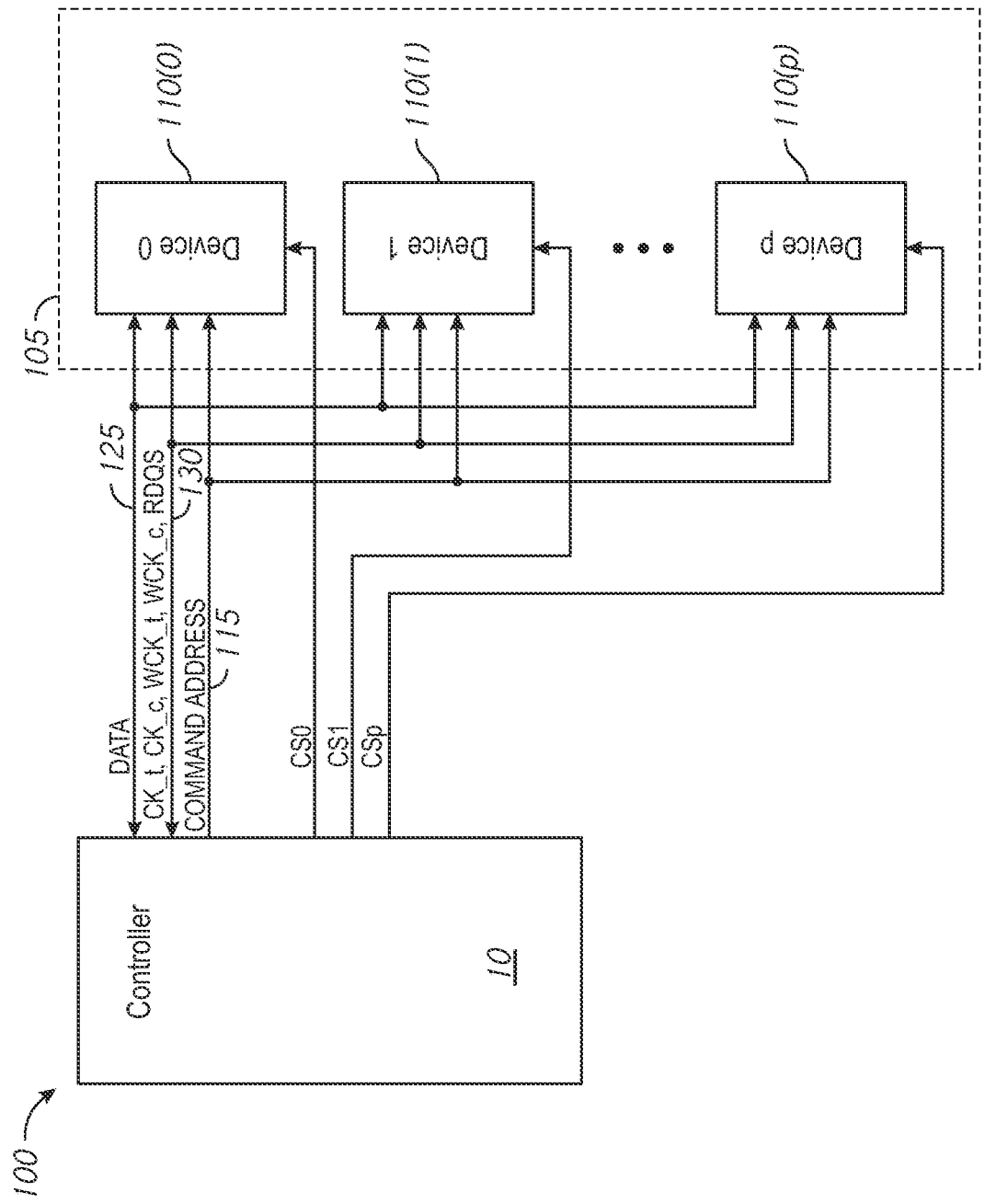
FIG. 1 is a block diagram of a system according to an embodiment of the disclosure.

A semiconductor memory may include a clock generator circuit for generating one or more clock signals, such as quadrature phase data clock signals. This may reduce or eliminate the need for synchronization operations to synchronize system and data clock signals in some applications. In some applications, the clock generator circuit may allow for data clock signals to be provided at a single rate (e.g., 2×CK) rather than two different rates (e.g., 2×CK followed by 4×CK).

Semiconductor memories are generally controlled by providing the memories with command signals, address signals, and clock signals. The various signals may be provided by a memory controller, for example. The command signals may control the semiconductor memories to perform various memory operations, for example, a read operation to retrieve data from a memory, and a write operation to store data to the memory.

With newly developed memories, the memories may be provided with system clock signals (which may be indicated by CK) that are used for timing command signals and address signals, for example, and further provided with data clock signals (which may be indicated by WCK) that are used for timing read data provided by the memory and for timing write data provided to the memory. The WCK signals are provided at a higher frequency than the CK signals (e.g., 2×CK, 4×CK). The memory uses the higher frequency WCK signals to generate internal data clock signals (IWCK) to time the writing of data to and reading of data from the memory. While the provision of WCK signals allows for faster operation of the memory, the memory must ensure the relationship between CK and WCK is known (e.g., CK and WCK are synchronized) to ensure proper latency control as the memory executes certain operations in the WCK domain responsive to commands received in the CK domain.

For memory devices in computing systems where power consumption is less critical (e.g., servers, gaming systems), the data clock signals may be continuously provided by the memory controller. In contrast, in computing systems more sensitive to power consumption, such as mobile devices (e.g., mobile phones, health monitors), the data clock signals may be provided by the memory controller only when providing write data and/or receiving read data. Reducing the number of continuously driven signals may reduce the power requirements of the system.

However, specifications for memories that tolerate starting and stopping the data clock signal require frequent synchronization operations to synchronize the WCK and CK signals prior to access commands, such as write commands. Synchronizing the WCK to the CK is required to ensure the relationship between WCK and CK are known. To perform the synchronization operation, an access command may be required to be preceded by additional commands, such as a CAS command. Passage of a delay period after the write command but prior to toggling the data clock signal WCK may also be required. The data clock signal is static for the delay period, thus, the delay period may be referred to as a static period. After the static period has elapsed, the synchronization operation may further require the data clock signal to be toggled at a lower frequency for a period of time before the data clock signal is toggled at the rate used for provisioning data to and from the memory. For example, the memory controller may provide WCK at a frequency of 2×CK for a period of time prior to providing WCK at a frequency of 4×CK. The period of time when the data clock signal is toggled initially at the lower frequency and then toggled at the higher frequency may be referred to as a pre-toggle period. Finally, by the completion of the pre-toggle period, the WCK is provided at the rate used for provisioning data to and from the memory. Once the WCK is provided at "full speed," there may be an additional delay before data may be provisioned due to the memory completing the synchronization operation.

Typically, in order for the memory to operate properly, the memory must frequently perform a clock synchronization operation to determine a temporal (e.g., phase) relationship between the system clock and data clock signals. For example, a synchronization operation may be required prior to execution of a first access command received by the memory after initialization and/or power-up. In another example, a synchronization operation may be required between successive access operations that access different ranks of memory. In another example, a synchronization operation may be required when too long a period of time has elapsed since a prior access operation. The frequent clock synchronization operations may increase the time of access operations and/or reduce the time the memory is available for performing operations.

The clock generator described herein, which may employ quadrature phase data clock signaling may not include a clock divider. In some embodiments, the memory may latch one or more clock signals responsive to one or more other clock signals. A clock generator circuit according to embodiments of the present disclosure may reduce or eliminate the need for synchronization operations to synchronize system and data clock signals in some applications. In some applications, the clock generator circuit may allow for data clock signals to be provided at a single rate (e.g., 2×CK) rather than two different rates (e.g., 2×CK followed by 4×CK).

Certain details are set forth below to provide a sufficient understanding of examples of the disclosure. However, it will be clear to one having skill in the art that examples of the disclosure may be practiced without these particular details. Moreover, the particular examples of the present disclosure described herein should not be construed to limit the scope of the disclosure to these particular examples. In other instances, well-known circuits, control signals, timing protocols, and software operations have not been shown in detail in order to avoid unnecessarily obscuring the disclosure. Additionally, terms such as "couples" and "coupled" mean that two components may be directly or indirectly electrically coupled. Indirectly coupled may imply that two components are coupled through one or more intermediate components.

FIG. 1 is a block diagram of a system 100 according to an embodiment of the disclosure. The system 100 includes a controller 10 and a memory system 105. The system 100 may be included in a computing system which may include a processor (not shown) that communicates with controller 10 and/or includes controller 10. The memory system 105 includes memories 110(0)-110(p) (e.g., "Device0" through "Devicep"), where p is a non-zero whole number. The memories 110(0)-110(p) are each coupled to the command/address, data, and clock busses. In some embodiments of the disclosure the memories 110(0)-110(p) are organized as ranks of memory. In such embodiments, the memories may be accessed by the ranks of memory. A rank may include one or more of the memories in some embodiments (e.g., one rank may include memory 110(0) and another rank includes memory 110(1)). A rank may include one or more portions of one or more of the memories in some embodiments (e.g., one or more banks of one or more of the memories). Other rank organizations may be used in other embodiments. The controller 10 and the memory system 105 are in communication over several communication busses. For example, commands and addresses are received by the memory system 105 on a command/address bus 115, and data is provided between the controller 10 and the memory system 105 over a data bus 125. Various clock signals may be provided between the controller and memory system 105 over a clock bus 130. The clock bus 130 may include signal lines for providing system clock signals CK_t and CK_c from the controller 10 and received by the memory system 105, providing data clock signals WCK_t, and WCK_c from the controller 10 and received by the memory system 105, and providing an access data clock signal RDQS from memory system 105 to the controller 10. Each of the busses may include one or more signal lines on which signals are provided.

The CK_t and CK_c signals provided by the controller 10 to the memory system 105 are used for timing the provision and receipt of the commands and addresses. In some embodiments, the controller 10 continuously provides active CK_t and CK_c signals when interacting with the memory system 105. The WCK_t and WCK_c signals and the RDQS signal are used for timing the provision of data between the controller 10 and the memory system 105 (e.g., write data from the controller 10 to the memory system 105 and read data from the memory system 105 to the controller 10). In some embodiments, the controller 10 may provide active WCK_t and WCK_c signals for access operations (e.g., read and/or write operations), but may provide inactive (e.g., static) WCK_t and WCK_c signals at other times, such as when non-access operations are performed. That is, the controller 10 may not continuously provide active WCK_t and WCK_c signals to the memory system 105. This may reduce power consumption of the system 100 in some applications.

The CK_t and CK_c signals are complementary to one another and the WCK_t and WCK_c signals are complementary to one another. Clock signals are complementary when a rising edge of a first clock signal occurs at the same time as a falling edge of a second clock signal, and when a rising edge of the second clock signal occurs at the same time as a falling edge of the first clock signal. Additionally, the WCK_t and WCK_c clock signals may have a higher clock frequency than the CK_t and CK_c signals in some embodiments. For example, in some embodiments of the disclosure, the WCK_t and WCK_c signals have a clock frequency that is four times the clock frequency of the CK_t and CK_c signals. In another example, in some embodiments of the disclosure, the WCK_t and WCK_c signals have a clock frequency that is two times the clock frequency of the CK_t and CK_c signals. The WCK_t and WCK_c signals may be provided by the controller 10 to the memory system 105 for access operations which may improve timing performance for the access operations.

The controller 10 provides commands to the memory system 105 to perform memory operations. Non-limiting examples of memory commands include timing commands for controlling the timing of various operations, access commands for accessing the memory, such as read commands for performing read operations and write commands for performing write operations, mode register write and read commands for performing mode register write and read operations, as well as other commands and operations. The command signals provided by the controller 10 to the memory system 105 further include select signals (e.g., chip select CS signals CS0, CS1, CSp). While all of the memories 110 are provided the commands, addresses, data, and clock signals, the select signals provided on respective select signal lines are used to select which of the memories 110 will respond to the command and perform the corresponding operation. In some embodiments of the disclosure, a respective select signal is provided to each memory 110 of the memory system 105. The controller 10 provides an active select signal to select the corresponding memory 110. While the respective select signal is active, the corresponding memory 110 is selected to receive to the commands and addresses provided on the command and address busses 115 and 120.

When a read command and associated address are provided by the controller 10 to the memory system 105, the memory 110 selected by the select signals receives the read command and associated addresses, and performs a read operation to provide the controller 10 with read data from a memory location corresponding to the corresponding addresses.

In preparation of the selected memory 110 providing the read data to the controller 10, the controller provides active WCK_t and WCK_c signals to the memory system 105. The WCK_t and WCK_c signals may be used by the selected memory 110 to generate an access data clock signal RDQS. A clock signal is active when the clock signal transitions between low and high clock levels periodically (e.g., toggles). Conversely, a clock signal is inactive when the clock signal maintains a constant clock level and does not transition periodically (e.g., static). The RDQS signal is provided by the memory 110 performing the read operation to the controller 10 for timing the provision of read data to the controller 10.

The controller 10 may use the RDQS signal for receiving the read data. In some embodiments of the disclosure, the controller 10 has two modes for using the RDQS signal for receiving the read data. In a first mode, the controller 10 may use the RDQS signal to control the timing of circuitry for capturing the read data from the selected memory 110. In a second mode, the controller 10 may recover a clock timing from the RDQS signal and generate an internal timing signal based on the recovered timing. The internal timing signal may then be used by the controller 10 to control the timing of circuitry for capturing the read data from the selected memory 110.

When a write command and associated address are provided by the controller 10 to the memory system 105, the memory 110 selected by the select signals receives the write command and associated addresses, and performs a write operation to write data from the controller 10 to a memory location corresponding to the corresponding addresses. In preparation of the selected memory 110 receiving the write data from the controller 10, the controller 10 provides active (e.g., toggling) WCK_t and WCK_c signals to the memory system 105. After the data clock signals are activated, the controller 10 may provide the write data to the selected memory 110. The WCK_t and WCK_c signals may be used by the selected memory 110 to generate internal clock signals for timing the operation of circuits to receive the write data. The data is provided by the controller 10 and the selected memory 110 receives the write data, which is written to memory corresponding to the memory addresses.

As will be described in further detail herein, in some embodiments, the selected memory 110 may include a clock generator circuit that may generate the internal clock signals. In some embodiments, the clock generator circuit may sample one or more clock signals. In some embodiments, the sampling may be achieved by latching one or more clock signals. In some embodiments, the sampling and/or latching may be responsive to one or more other clock signals. For example, the clock generator circuit may latch system clock signal CK_t and/or CK_c (and/or clock signals based on the system clock signals) to generate the internal clock signals, and the latching of the system clock signal may be responsive to data clock signal WCK_t and/or WCK_c (and/or clock signals based on the data clock signals). By generating the internal clock signals based on one clock signal responsive to another clock signal, in some applications, a need for the system clock signals CK_t and/or CK_c and the data clock signals WCK_t and/or WCK_c to be synchronized may be reduced or eliminated.

Thus, the clock generator circuit may reduce or eliminate the need for synchronization operations in some applications. This may reduce or eliminate static and/or pre-toggle periods prior to performing access commands. This may reduce or eliminate requirements for the controller 10 to provide synchronization commands prior to issuing access commands. In some applications, the clock generator circuit may allow the controller 10 to provide the WCK_t and/or WCK_c signals at a single rate rather than two different rates. By reducing or eliminating synchronization operations, the memory 110 may have reduced delays prior to execution of an access operation in some applications.

Furthermore, techniques for generating the internal clock signals according to the embodiments disclosed herein, such as by latching, the clock generator circuit need not include a clock divider.

Figure 2:
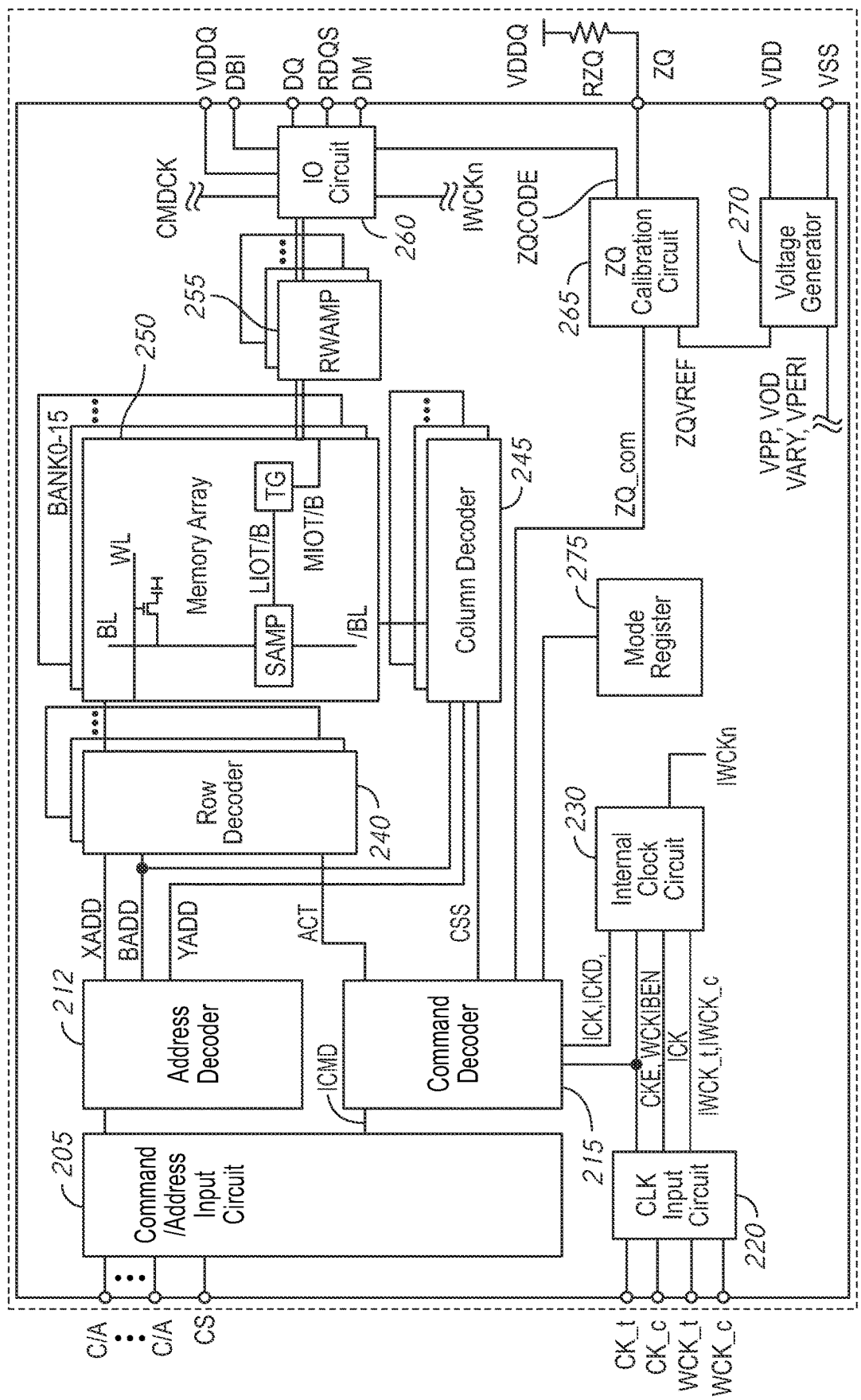
FIG. 2 is a block diagram of an apparatus according to an embodiment of the disclosure.

FIG. 2 is a block diagram of an apparatus according to an embodiment of the disclosure. The apparatus may be a semiconductor device 200, and will be referred as such. In some embodiments, the semiconductor device 200 may include, without limitation, a dynamic random access (DRAM) device, such as low power double data rate (LPDDR) memory integrated into a single semiconductor chip, for example. The semiconductor device 200 may be included in the memory system 105 of FIG. 1 in some embodiments of the disclosure. For example, each of the memories 110 may include a semiconductor device 200. The semiconductor device 200 includes a memory die. The die may be mounted on an external substrate, for example, a memory module substrate, a mother board or the like. The semiconductor device 200 may further include a memory array 250. The memory array 250 includes a plurality of banks, each bank including a plurality of word lines WL, a plurality of bit lines BL, and a plurality of memory cells MC arranged at intersections of the plurality of word lines WL and the plurality of bit lines BL. The selection of the word line WL is performed by a row decoder 240 and the selection of the bit line BL is performed by a column decoder 245. Sense amplifiers (SAMP) are located for their corresponding bit lines BL and connected to at least one respective local I/O line pair (LIOT/B), which is in turn coupled to at least respective one main I/O line pair (MIOT/B), via transfer gates (TG), which function as switches.

The semiconductor device 200 may employ a plurality of external terminals that include command and address terminals coupled to a command/address (C/A) bus to receive command and address signals, clock terminals to receive clock signals CK_t and CK_c, data clock terminals to receive data clock signals WCK_t and WCK_c, data terminals DQ, RDQS, DBI, and DMI, power supply terminals VDD, VSS, VDDQ, and VSSQ, and the ZQ calibration terminal (ZQ).

The C/A terminals may be supplied with an address and a bank address signal from outside. The address signal and the bank address signal supplied to the address terminals are transferred, via a command/address input circuit 205, to an address decoder 212. The address decoder 212 receives the address signals and supplies a decoded row address signal XADD to the row decoder 240, and a decoded column address signal YADD to the column decoder 245. The address decoder 212 also receives the bank address signal BADD and supplies the bank address signal to the row decoder 240 and the column decoder 245.

The C/A terminals may further be supplied with command signals from, for example, a memory controller, such as controller 10 of FIG. 1. The command signals may be provided as internal command signals ICMD to a command decoder 215 via the command/address input circuit 205. The command decoder 215 includes circuits to decode the internal command signals ICMD to generate various internal signals and commands for performing operations, for example, a row activation signal (ACT) to select a word line and a column select signal (CSS) to select a bit line. Another example may be providing internal signals to enable circuits for performing operations, such as control signals to enable signal input buffers that receive clock signals. The internal commands also include output and input activation commands.

The command decoder 215 may access mode register 275 that is programmed with information for setting various modes and features of operation for the semiconductor device 200. In some embodiments, mode register 275 may include multiple registers. The information in the mode register 275 may be programmed by providing the semiconductor device 200 a mode register write command, which causes the semiconductor device 200 to perform a mode register write operation. In some embodiments, data to be written to the mode register 275 is provided via the C/A terminals and/or the DQ terminals. The command decoder 215 accesses the mode register 275, and based on the programmed information along with the internal command signals provides the internal signals to control the circuits of the semiconductor device 200 accordingly. Information programmed in the mode register 275 may be externally provided by the semiconductor device 200 using a mode register read command, which causes the semiconductor device 200 to access the mode register 275 and provide the programmed information (e.g., to the memory controller). In some embodiments, the information may be provided via the C/A terminals and/or the DQ terminals.

When a read command is issued and a row address and a column address are timely supplied with the read command, read data is read from a memory cell in the memory array 250 designated by these row address and column address. The read command is received by the command decoder 215, which provides internal commands to input/output circuit 260 so that read data is output to outside from the data terminals DQ, DBI, and DMI via read/write amplifiers 255 and the input/output circuit 260 according to the RDQS clock signals.

When a write command is issued and a row address and a column address are timely supplied memory controller, such as controller 10, write data is written to the memory cell in the memory array 250 designated by these row address and column address. The write data is supplied from the controller to the data terminals DQ, DBI, and DMI according to the WCK_t and WCK_c clock signals. The activation and write commands are received by the command decoder 215, which provides internal commands to the input/output circuit 260 so that the write data is received by data receivers in the input/output circuit 260, and supplied via the input/output circuit 260 and the read/write amplifiers 255 to the memory array 250.

In some examples, the command/address input circuit 205 may be omitted and the command decoder 215 and/or address decoder 212 may be directly coupled to the C/A terminals. In some examples, at least a portion of the command/address input circuit 205 may be included in the command decoder 215 and/or address decoder 212.

Turning to the explanation of the external terminals included in the semiconductor device 200, the clock terminals and data clock terminals are supplied with external clock signals and complementary external clock signals. The external clock signals CK_t, CK_c, WCK_t, WCK_c may be supplied to a clock input circuit 220. When enabled, input buffers included in the clock input circuit 220 pass the external clock signals. For example, an input buffer passes the CK_t and CK_c signals when enabled by a CKE signal from the command decoder 215 and an input buffer passes the WCK_t and WCK_c signals when enabled by a WCKIBEN signal from the command decoder 215. The clock input circuit 220 may use the external clock signals passed by the enabled input buffers to generate internal clock signals ICK and IWCK_t and IWCK_c. The internal clock signals ICK and IWCK_t and IWCK_c are supplied to internal clock circuits 230.

The internal clock circuits 230 includes circuits that provide various phase and frequency controlled internal clock signals based on the received internal clock signals. For example, the internal clock circuits 230 may include a clock path (not shown in FIG. 2) that receives the ICK clock signal and provides internal clock signals ICK and ICKD to the command decoder 215. Although referred to as ICK and ICKD, in some embodiments, ICK and ICKD may include complementary signals. For example, ICK may include ICK_t and ICK_c and ICKD may include ICKD_t and ICKD_c in some embodiments. The internal clock circuits 230 may further include a data clock path that receives the IWCK_t and IWCK_c clock signals and/or ICK and ICKD signals and provides multiphase clock signals IWCKn. As will be described in more detail, the multiphase clock signals IWCKn have relative phases with each other. The multiphase clock signals IWCKn may also be provided to the input/output circuit 260 for controlling an output timing of read data and the input timing of write data. The input/output circuit 260 may include clock circuits and driver circuits for generating and providing the RDQS signal to a controller.

According to embodiments of the present disclosure, the internal clock circuits 230 may include a clock generator circuit (not shown in FIG. 2, see FIGS. 3 and 5) to generate the multiphase clock signals IWCKn signals. In some embodiments, the clock generator circuit may sample, such as by latching, one or more clock signals to generate the multiphase clock signals IWCKn. In some embodiments, the clock generator circuit may sample the one or more clock signals responsive to another one or more clock signals. In some embodiments, the clock generator circuit of the internal clock circuits 230 may sample ICK to generate the multiphase clock signals IWCKn. In some embodiments, the sampling may be responsive, at least in part, to another clock signal. In some embodiments, the clock generator circuit may latch ICK responsive, at least in part, to the IWCK_t and/or IWCK_c signals.

The power supply terminals are supplied with power supply potentials VDD and VSS. These power supply potentials VDD and VSS are supplied to an internal voltage generator circuit 270. The internal voltage generator circuit 270 generates various internal potentials VPP, VOD, VARY, VPERI, and the like and a reference potential ZQVREF based on the power supply potentials VDD and VSS. The internal potential VPP is mainly used in the row decoder 240, the internal potentials VOD and VARY are mainly used in the sense amplifiers included in the memory array 250, and the internal potential VPERI is used in many other circuit blocks. The reference potential ZQVREF is used in the ZQ calibration circuit 265.

The power supply terminal is also supplied with power supply potential VDDQ. The power supply potentials VDDQ is supplied to the input/output circuit 260 together with the power supply potential VSS. The power supply potential VDDQ may be the same potential as the power supply potential VDD in an embodiment of the disclosure. The power supply potential VDDQ may be a different potential from the power supply potential VDD in another embodiment of the disclosure. However, the dedicated power supply potential VDDQ is used for the input/output circuit 260 so that power supply noise generated by the input/output circuit 260 does not propagate to the other circuit blocks.

The calibration terminal ZQ is connected to the ZQ calibration circuit 265. The ZQ calibration circuit 265 performs a calibration operation with reference to an impedance of RZQ, and the reference potential ZQVREF, when activated by the ZQ calibration command ZQ_com. An impedance code ZQCODE obtained by the calibration operation is supplied to the input/output circuit 260, and thus an impedance of an output buffer (not shown) included in the input/output circuit 260 is specified.

In some embodiments, various components of semiconductor device 200 may be considered peripheral circuitry. In some embodiments, the clock input circuit 220, the internal clock circuit 230, and/or other components may be considered peripheral circuitry. In some embodiments, all circuitry outside of the memory array 250 may be considered peripheral circuitry.

Figure 3:
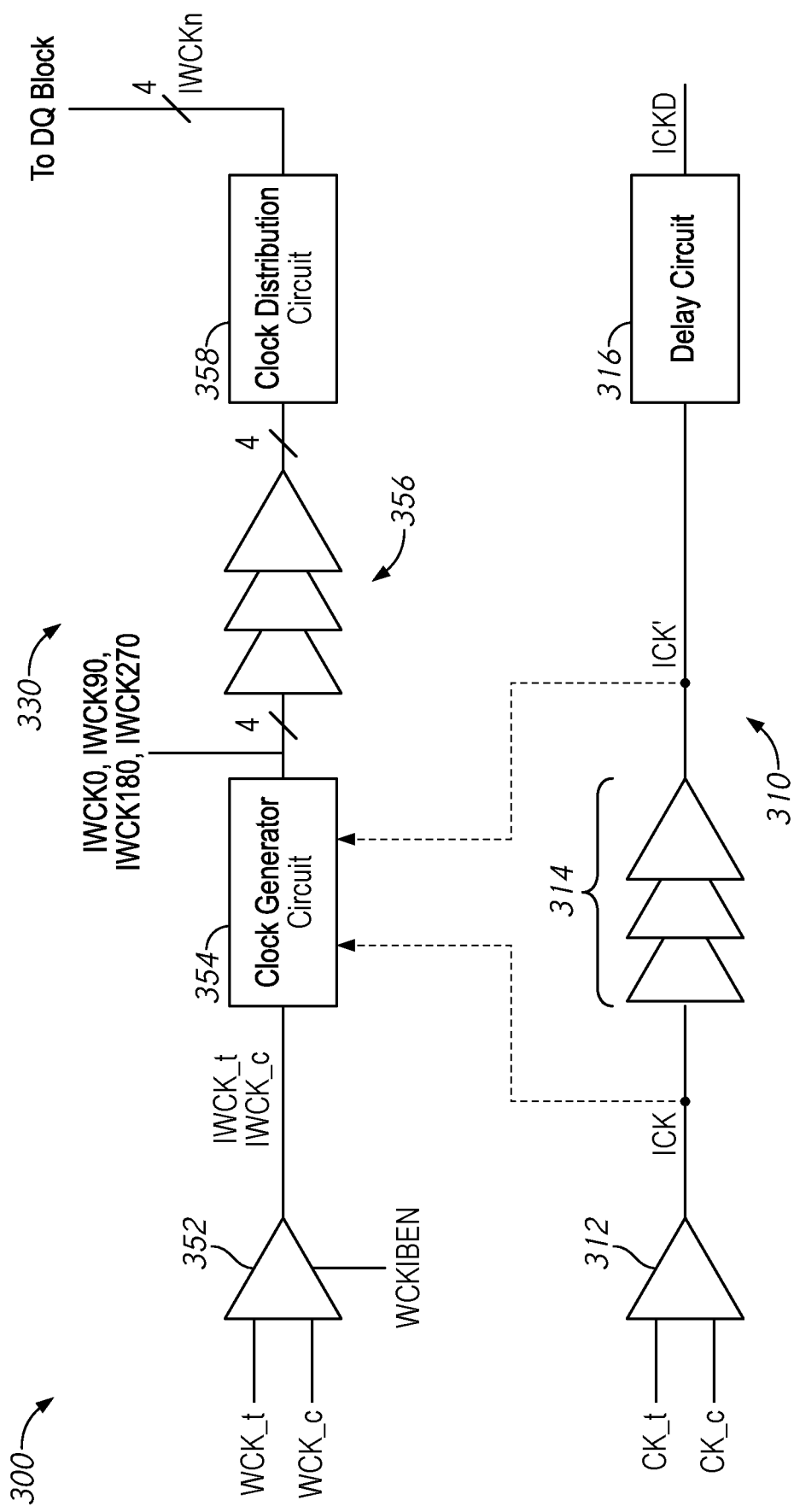
FIG. 3 is a block diagram of a clock path and a data clock path according to an embodiment of the disclosure.

FIG. 3 is a block diagram of a clock path 310 and a data clock path 330 according to an embodiment of the disclosure. The clock path 310 and data clock path 330 may be included in the semiconductor device 200 of FIG. 2 in some embodiments of the disclosure. For example the data clock path 330 may be included in the clock input circuit 220 and/or the internal clock circuit 230 of the semiconductor device 200 of FIG. 2. One or both of the clock path 310 and the data clock path 330 may be modified without departing from the scope of the present disclosure.

The clock path 310 may include an input buffer 312 that receives complementary clock signals CK_t and CK_c and provides an internal clock signal ICK. The input buffer 312 may be included in the clock input circuit 220 of FIG. 2. The internal clock signal ICK is based on the CK_t and CK_c clock signals. Repeater circuits 314 receive the ICK clock signal and provide an ICK' clock signal to a delay circuit 316. The repeater circuits 314 drive the ICK' clock signal over a clock line from the input buffer 312 to the delay circuit 316. The ICK' clock signal is delayed by the delay circuit 316 to provide a delayed ICK clock signal ICKD. The ICK' and ICKD signals may be used by a command path (not shown) for timing the decoding and provision of internal command signals to perform memory operations (e.g., read, write, etc.).

The data clock path 330 includes an input buffer 352. When enabled by an active enable signal WCKIBEN (e.g., active high logic level), the input buffer 352 receives complementary clock signals WCK_t and WCK_c and provides the complementary internal clock signals IWCK_t and IWCK_c based on the WCK_t and WCK_c clock signals. The input buffer 352 may be enabled, for example, by a command decoder responsive to a memory command. In an embodiment of the disclosure, the IWCK_t and IWCK_c clock signals have a same clock frequency as a clock frequency of the WCK_t and WCK_c clock signals, and the IWCK_t clock signal corresponds to the WCK_t clock signal and the IWCK_c clock signal corresponds to the WCK_c clock signal. The input buffer 352 may be included in the clock input circuit 220 of FIG. 2.

The IWCK_t and IWCK_c clock signals are provided to a clock generator circuit 354 that is configured to provide multiphase clock signals IWCK0, IWCK90, IWCK180, IWCK270 (collectively referred to as the multiphase clock signals IWCKn).

According to embodiments of the present disclosure, ICK and/or ICK' clock signals from the clock path 310 may be provided to the clock generator circuit 354 of the data clock path 330. In some embodiments, the multiphase clock signals IWCKn may be based, at least in part, on sampling of the ICK and/or ICK' clock signals. In some embodiments, the sampling may be performed, at least in part, responsive to the IWCK_t and/or IWCK_c signals. For example, the sampling may be performed responsive to rising and/or falling clock edges of the IWCK_t and/or IWCK_c signals. In some embodiments, sampling may be implemented by latching the ICK and/or ICK' clock signals.

In some embodiments, the multiphase clock signals have relative phases to one another, and have a clock frequency that is less than a clock frequency of the WCK_t and WCK_c clock signals (and the IWCK_t and IWCK_c signals). In some embodiments of the disclosure, the IWCK0, IWCK90, IWCK180, and IWCK270 clock signals have a clock frequency that is one-half the clock frequency of the WCK_t and WCK_c clock signals. In some embodiments, the IWCK0, IWCK90, IWCK180, and IWCK270 clock signals have a frequency equal to (e.g., the same as) the frequency of the ICK signal. Thus, in embodiments where the IWCKn signals are generated by sampling the ICK and/or ICK signals, a divider for dividing the WCK_t and/or WCK_c clock signals may not be required.

Figure 4:
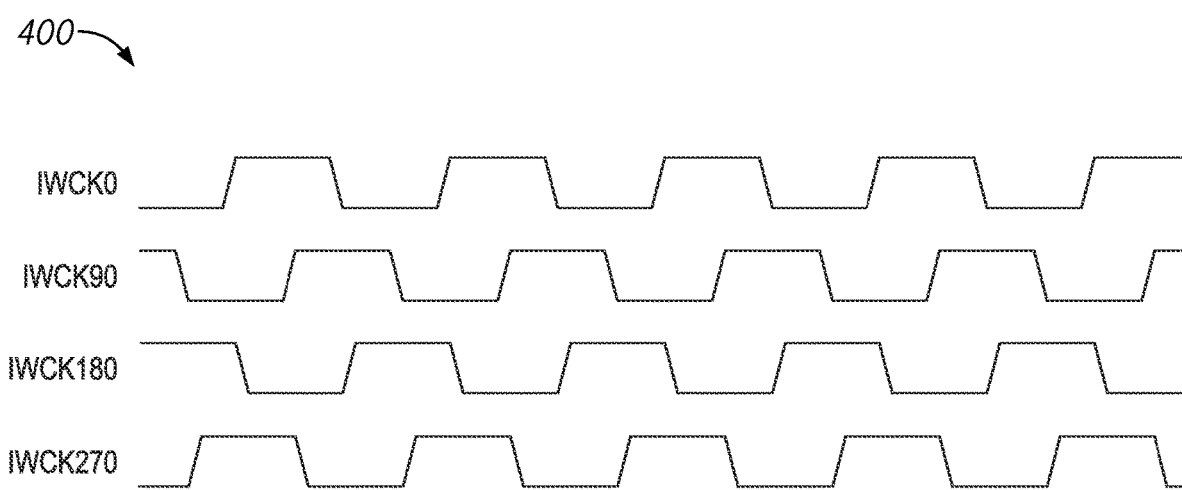
FIG. 4 is a timing diagram showing relationships between clock signals according to an embodiment of the disclosure.

In some embodiment of the disclosure, the IWCK0, IWCK90, IWCK180, and IWCK270 clock signals have a relative phase of 90 degrees to one another. For example, the IWCK90 clock signal has a phase of 90 degrees relative to the IWCK0 clock signal, the IWCK180 clock signal has a phase of 180 degrees relative to the IWCK0 clock signal (and a phase of 90 degrees relative to the IWCK90 clock signal), and the IWCK270 clock signal has a phase of 270 degrees relative to the IWCK0 clock signal (and a phase of 90 degrees relative to the IWCK180 clock signal). In such a case, the multiphase clock signals IWCK0, IWCK90, IWCK180, IWCK270 may be referred to as "quadrature" phase clock signals. The IWCK0, IWCK90, IWCK180, IWCK270 signals may have a phase relationship relative to one another that are illustrated in timing diagram 400 in FIG. 4.

Returning to FIG. 3, the multiphase clock signals are provided to repeater circuits 356. The repeater circuits 356 include a repeater circuit for each of the multiphase clock signals IWCKn. The repeater circuits 356 drive the multiphase clock signals IWCKn over clock lines from the clock generator circuit 354 to a clock distribution circuit 358. The clock distribution circuit 358 provides the multiphase clock signals IWCKn to various circuitries that operate according to the multiphase clock signals. For example, the multiphase clock signals IWCKn may be provided to clock input/output circuits (not shown in FIG. 3) to provide and receive data (referenced in FIG. 3 as "To DQ block").

Figure 5:
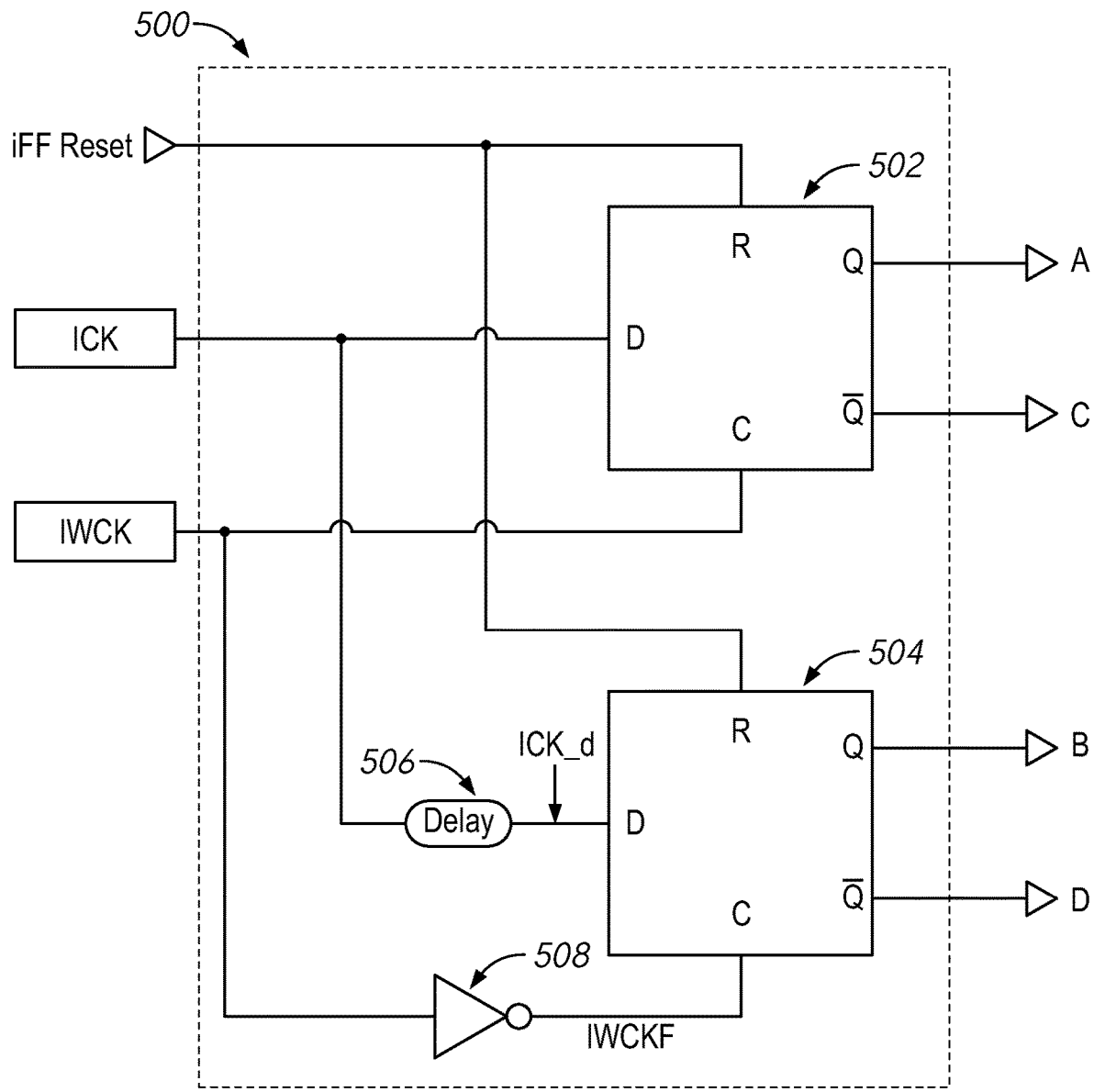
FIG. 5 is a block diagram of a clock generator circuit according to an embodiment of the disclosure.

FIG. 5 is a block diagram of a clock generator circuit according to an embodiment of the disclosure. The clock generator circuit 500 may be used to implement the clock generator circuit 354 in some embodiments. In some embodiments, the clock generator circuit 500 may be included in clock input circuit 220 and/or internal clock circuits 230.

The clock generator circuit 500 may include a latch 502 and a latch 504. In some embodiments, latch 502 and/or 504 may be implemented by D flip-flops. Latch 502 and latch 504 may receive the internal clock signals and IWCK. In some embodiments, ICK and IWCK may include complementary signals. For example, ICK may include ICK_t and ICK_c and IWCK may include IWCK_t and IWCK_c in some embodiments. In some embodiments, ICK may include only one of ICK_t or ICK_c and/or IWCK may include only one of IWCK_t or IWCK_c. The ICK and IWCK signals may be provided to clock generator circuit 500 by input buffers, such as input buffers 312 and 352, respectively.

In some embodiments, latch 502 may receive ICK at an input (e.g., D input of a flip-flop) and IWCK at a clock input (e.g., C input of the flip-flop). In some embodiments, latch 502 may receive an iFF Reset signal at a reset input (e.g., R input of the flip-flop). The iFF Reset signal may enable and disable the latch 502. The latch 502 may provide two outputs, A and C. In some embodiments, outputs A and C may be complementary (e.g., Q and Q outputs of the flip-flop). In some embodiments, outputs A and C may be two of the quadrature phase clock signals IWCK0, IWCK90, IWCK180, IWCK270.

In some embodiments, latch 504 may receive ICK at an input (e.g., D input of a flip-flop). However, optionally, in some embodiments, such as the one shown in FIG. 5, clock generator circuit 500 may further include a delay circuit 506, and the input of latch 504 may receive a delayed ICK signal, ICK_d. In some embodiments, delay circuit 506 may be implemented, at least in part, by repeater circuit 314, and the input to the latch 504 may be ICK' (e.g., ICK_d=ICK').

In some embodiments, such as the one shown in FIG. 5, clock generator circuit 500 may further include an inverter 508. The inverter 508 may receive the IWCK signal and provide an inverted IWCK signal, IWCKF, to a clock input (e.g., C input of the flip-flop) of latch 504. However, in some embodiments, IWCK_t may be provided to latch 502 and IWCK_c may be provided to latch 504, and inverter 508 may be omitted (e.g.. IWCKF=IWCK_c). In some embodiments, latch 504 may receive an iFF Reset signal at a reset input (e.g., R input of the flip-flop). The iFF Reset signal may enable and disable the latch 504. The latch 504 may provide two outputs, B and D. In some embodiments, outputs B and D may be complementary (e.g., Q and Q outputs of the flip-flop). In some embodiments, outputs B and D may be another two of the quadrature phase clock signals IWCK0, IWCK90, IWCK180, IWCK270.

In some embodiments, the iFF Reset signal may disable latch 502 and latch 504 when no active IWCK is provided (e.g., when no active WCK_t and/or WCK_c is provided to a device including clock generator circuit 500), when no access command has been received, and/or when no quadrature phase clock signals are required to be provided. The iFF Reset signal may enable latch 502 and latch 504 when an active IWCK is provided (e.g., when an active WCK_t and/or WCK_c is provided to a device including clock generator circuit 500) and/or responsive to an access command. In some embodiments, the iFF Reset signal may be implemented by the enable signal WCKIBEN and/or inverse of the WCKIBEN signal. For example, latches 502 and 504 may be enabled when iFF Reset is low (e.g., iFF Rest is active low), and iFF Reset may be implemented by providing the inverse WCKIBEN signal in some embodiments. In other embodiments, iFF Reset may be a signal provided by another component, such as a command decoder (e.g., command decoder 215).

In operation, latch 502 latches the ICK signal on an edge of the IWCK signal (e.g., a rising edge) to sample the ICK signal. Output A will match a state of the ICK signal latched by latch 502 (e.g., ICK=high ('1')=A, ICK=low ('0')=A), and output C will be a complement of the state of the ICK signal latched by latch 502 (e.g., ICK=high ('1'), C=low ('0'); ICK=low ('0'), C=high ('1')).

Latch 504 latches the ICK_d signal on an edge of the IWCKF signal (e.g., a rising edge) to sample the ICK_d signal. Because IWCKF is the inverse of IWCK, latch 504 may effectively latch the ICK_d signal on a different clock edge of the IWCK signal (e.g., falling edge) than latch 502 latches the ICK signal. Output B will match a state of the ICK_d signal latched by latch 504 (e.g., ICK_d=high ('1') =B, ICK_d=low ('0')=B), and output D will be a complement of the state of the ICK_d signal latched by latch 504 (e.g., ICK_d=high ('1'), D=low ('0'); ICK_d=low ('0'), D=high ('1')). The effect of generating two sets of complementary signals on the rising (e.g., signals A and C) and falling (e.g., signals B and D) edges of the IWCK clock signal is a set of quadrature phase clock signals.

In the embodiment shown in FIG. 5, the clock generator circuit generates the quadrature phase clock signals from the state of the ICK signal, and the rising and falling edges of the IWCK signal are used to trigger latching of the state. In this embodiment, no divider is required. Thus, in some applications, IWCK may be provided at 2×CK to achieve the desired phases and frequency of the quadrature phase signals, and providing IWCK at 4×CK may not be necessary.

Furthermore, because IWCK is use for latching the ICK signal, the timing requirements for IWCK and ICK may be relaxed. That is, IWCK and ICK may not need to be synchronized and/or the tolerances of the synchronization may be increased. This may reduce or eliminate the need for synchronization operations in some application. Thus, in some embodiments, a static period and/or a pre-toggle period prior to an access operation may be reduced or eliminated.

Including the optional delay circuit 506 may increase the timing tolerances between ICK and IWCK. In some embodiments, the delay circuit 506 may relax the timing for the falling edge of the IWCK signal. In some embodiments, the delay circuit 506 may delay ICK signal by an amount sufficient to compensate for the sample and hold (S/H) timing of the latches (e.g., tS+tH). In some embodiments the delay circuit 506 may delay ICK by half a clock cycle of the IWCK signal.

Figure 6:
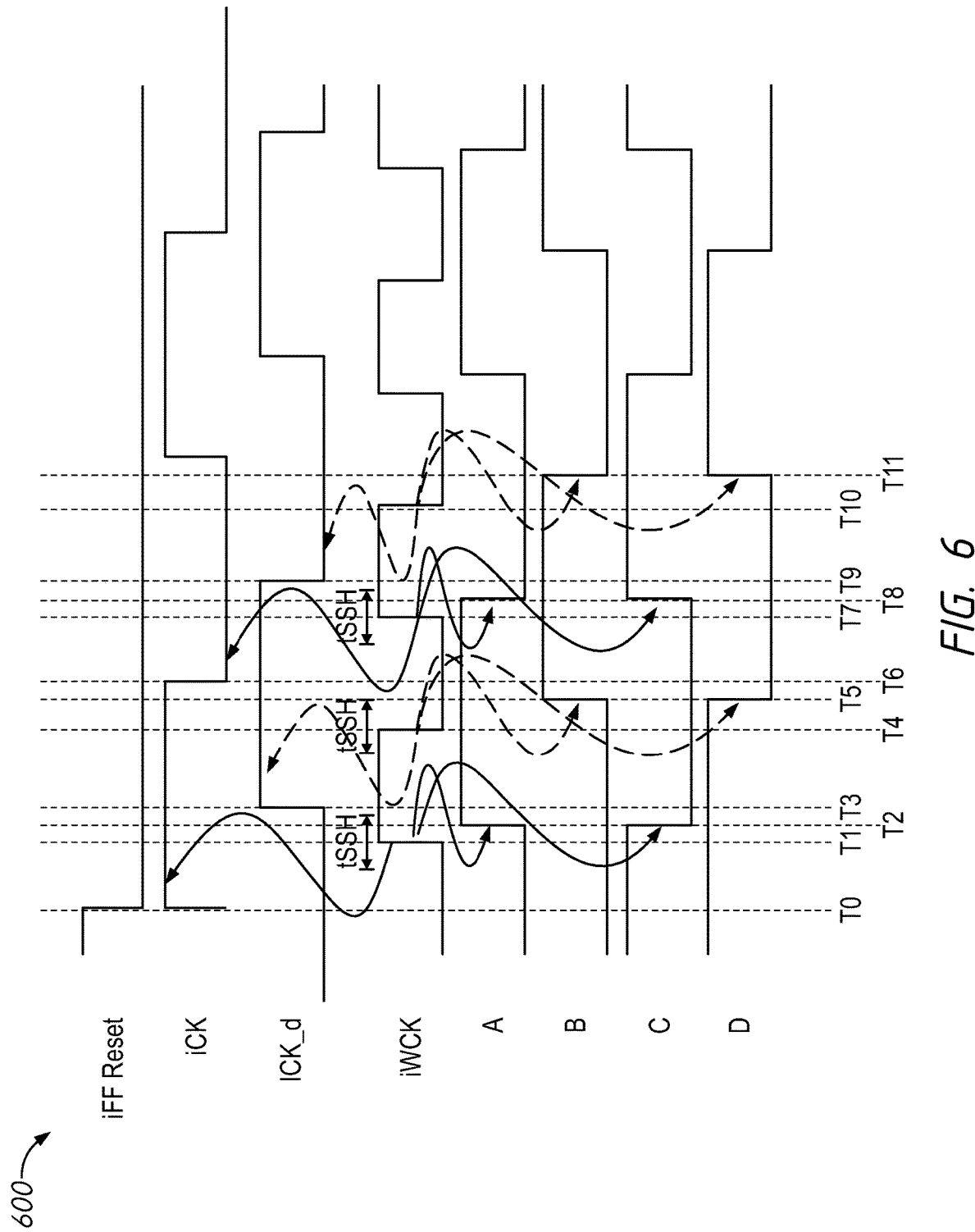
FIG. 6 is a timing diagram of various clock signals according to an embodiment of the disclosure.

FIG. 6 is a timing diagram of various clock signals according to an embodiment of the disclosure. Timing diagram 600 illustrates the relationship between states of a control signal (IFF Reset) and various clock signals (ICK, ICK_d, IWCK, A, B, C, D) received and provided from a clock generator circuit such as clock generator circuit 500 and/or 354. Outputs A, B, C, and D may correspond to quadrature phase clock signals, such as quadrature phase clock signals IWCK0, IWCK90, IWCK180, IWCK270. Although timing diagram 600 will be described with reference to clock generator circuit 500 for illustration, timing diagram 600 is not limited to the behavior of clock generator circuit 500.

At or around time T0, an IFF Reset signal transitions to a low logic level. The transition may be responsive, at least in part, to activation of a WCKIBEN enable signal, an access command from a controller (e.g., read/write), or a combination thereof. In some embodiments, the low IFFReset signal may enable latches of a clock generator circuit, such as latches 502 and 504 of clock generator circuit 500.

Also at or around time T0, an internal clock signal ICK may transition to a high clock level. The ICK signal may be provided by an input buffer such as input buffer 312 in some embodiments. The internal clock signal ICK may be received by one of the latches, such as latch 502.

At or around time T1, an internal data clock signal IWCK may transition to a high clock level. The IWCK signal may be provided by an input buffer such as input buffer 352 in some embodiments. The IWCK signal may be provided to one of the latches, such as latch 502 and an inverse of the IWCK signal (not shown in FIG. 6) may be provided to the other one of the latches, such as latch 504. Responsive to the rising edge of the IWCK signal, latch 502 may latch a state of ICK (high) at or around T1.

At or around time T2, latch 502 may provide outputs A and C based on the ICK signal latched at or around time T1. Because ICK was high at or around time T1, at or around time T2, output A transitions to a high clock level and output C transitions to a low clock level.

In some embodiments, such as the one shown in FIGS. 5 and 6, one of the latches, such as latch 504 may receive a delayed ICK signal, ICK_d. The ICK signal may be delayed by a delay circuit such as delay circuit 506. As shown in FIG. 6, at or around time T3, ICK_d transitions to a high clock state.

At or around time T4, the IWCK signal transitions to a low clock level. Responsive, at least in part, to the falling edge of IWCK, latch 504 may latch the state of the ICK_d signal (high) at or around time T4. At or around time T5, latch 504 may provide outputs B and D based on the ICK_d signal latched at or around time T4. Because ICK_d was high at or around time T4, at or around time T5, output B transitions to a high clock level and output D transitions to a low clock level.

At or around time T6, the ICK signal transitions to a low clock state. As noted previously, ICK_d is delayed relative to ICK. ICK_d may be delayed a sufficient amount to account for the sample (tS) and hold (tH) times of the latches responsive to the IWCK signal. This may increase the timing margins of the clock generator circuit, for example, by relaxing the timing of the falling edge of the IWCK signal. As shown in FIG. 6, the falling edge of IWCK at time T4 is not near an edge of the ICK_d signal. However, time T4 is not far from time T6, the falling edge of ICK. Thus, if latch 504 also received ICK instead of ICK_d, and the IWCK signal was misaligned, latch 504 could latch ICK at a low clock level, which would cause outputs A, B, C, and D to no longer provide a quadrature phase clock signal. This could lead to operation errors or improper provisioning of data between a memory and a controller. Accordingly, providing a delayed ICK signal, ICK_d, may improve the robustness of the clock generator circuit. In some embodiments, providing ICK_d may further reduce or eliminate the need for ICK and IWCK to be synchronized.

At or around time T7, IWCK transitions to a high clock level. Responsive to the rising edge of the IWCK signal, latch 502 may latch a state of ICK (low) at or around T7. At or around time T8, latch 502 may provide outputs A and C based on the ICK signal latched at or around time T7. Because ICK was low at or around time T7, at or around time T8, output A transitions to a low clock level and output C transitions to a high clock level.

At or around time T9, ICK_d transitions to a low clock level. At or around time T10, IWCK transitions to a low clock level. Responsive, at least in part, to the falling edge of IWCK, latch 504 may latch the state of the ICK_d signal (high) at or around time T10. At or around time T11, latch 504 may provide outputs B and D based on the ICK_d signal latched at or around time T10. Because ICK_d was low at or around time T10, at or around time T11, output B transitions to a low clock level and output D transitions to a high clock level.

The generation of quadrature phase clock signals A, B, C, D by the clock generator circuit may continue until the iFF Reset signal transitions high (not shown in FIG. 6). The iFF Reset signal may transition high responsive, at least in part, to a completion of an access command, receipt of a different command, deactivation of the WCKIBEN enable signal, or a combination thereof.

Using latches to sample the state of the ICK signal responsive to the IWCK signal to generate the generate the quadrature phase clock signals A, B, C, and D may loosen the requirements for a known relationship between ICK and IWCK compared to clock signal generators that require synchronization between the ICK and IWCK signals (e.g., a clock divider). As shown in timing diagram 600, in some embodiments, it may be desirable for the IWCK and ICK signals to have a phase relationship such that the clock edges of the ICK signal do not coincide with the clock edges of the IWCK signal to provide predictability as to the state of the ICK signal sampled by the latches to generate the quadrature phase clock signals A, B, C, and D. However, as indicated in part by tS and tH of the latches, the margin for the phase relationship between ICK and IWCK is relatively wide, particularly compared to the margin for clock signal generators that require ICK and IWCK to be synchronized.

Figure 7:
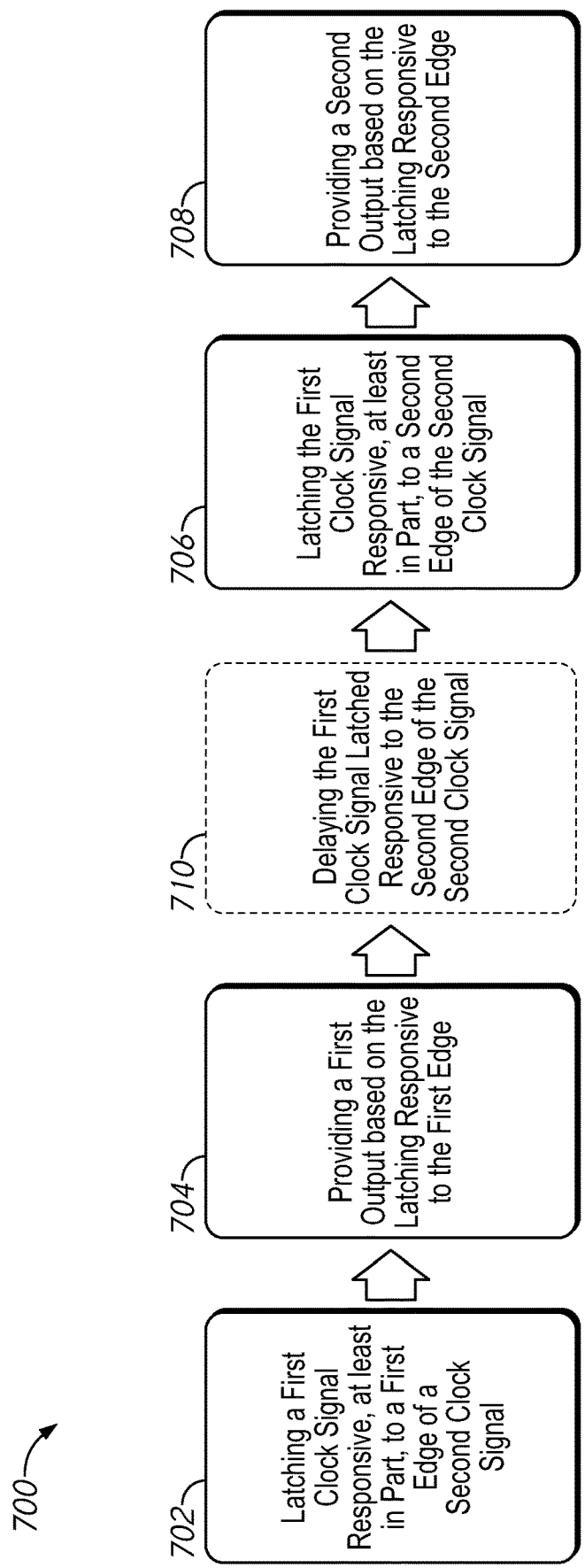
FIG. 7 is a flow chart of a method according to an embodiment of the disclosure.

FIG. 7 is a flow chart of a method according to an embodiment of the disclosure. In some embodiments, the method shown in flowchart 700 may be performed in whole or in part by a memory device, such as memories 110(0-$p$) and/or device 200. In some embodiments, the method shown in flowchart 700 may be performed in whole or in part by a clock generator circuit, such as clock generator circuit 354 and/or clock generator circuit 500. As noted previously, clock generator circuit 354 and/or 500 may be included in any or all of memories 110(0-$p$) and device 200 (e.g., within clock input circuit 220 and/or internal clock circuits 230).

At block 702, "latching a first clock signal responsive, at least in part, to a first edge of a second clock signal" may be performed. In some embodiments, the latching may be performed by a latch, such as latch 502 and/or latch 504. Latching may sample the first clock signal in some embodiments. In some embodiments, the first clock signal may include a system clock signal (CK_t and/or CK_c) and/or an internal system clock signal which may be based, at least in part on the system clock signal (e.g., ICK). In some embodiments, the second clock signal may include a data clock signal (WCK_t and/or WCK_c) and/or an internal data clock signal which may be based, at least in part on the data clock signal (e.g., IWCK_t, IWCK_c, and/or IWCK). In some embodiments, the first and second clock signals may have different frequencies. In some embodiments, the first clock signal may have a frequency that is less than a frequency of the second clock signal. In some embodiments, the first clock signal has a frequency that is half the frequency of the second clock signal (e.g., the second clock signal frequency is double/twice the frequency of the first clock signal).

At block 704, "providing a first output based on the latching responsive to the first edge" may be performed. In some embodiments, the first output may be provided by the latch such as latch 502 and/or latch 504. The output may include a clock signal, such as outputs A, B, C, and/or D.

At block 706, "latching the first clock signal responsive, at least in part, to a second edge of the second clock signal" may be performed. In some embodiments, the latching may be performed by another latch, such as the other one of latch 502 and/or latch 504. In some embodiments, the latch may be triggered by a different edge of the second clock signal. In some embodiments, the latch may receive a complementary (e.g., IWCK_c) and/or inverted second clock signal such that the latching is performed responsive to the second edge.

At block 708, "providing a second output based on the latching responsive to the second edge" may be performed. In some embodiments, the second output may be provided by the other latch, such as the other of latch 502 and/or latch 504. The output may include a clock signal, such as outputs A, B, C, and/or D. In some embodiments, the first output comprises a first pair of complementary clock signals (e.g., A and C and/or B and D) and the second output comprises a second pair of complementary clock signals (e.g., C and/or B and/or A and C). In some embodiments, the first pair and second pair of complementary clock signals comprise a quadrature phase clock signals, such as IWCK0, IWCK90, IWCK180, IWCK270 (IWCKn). In some embodiments, the outputs may be provided to an IO circuit, such as IO circuit 260.

Optionally, at block 710, "delaying the first clock signal latched responsive to the second edge of the second clock signal" may be performed. In some embodiments, the first clock signal provided to one of the latches, such as latch 502 or 504 may be delayed, thus causing the latch to latch the delayed signal. In some embodiments, the delay may be half a clock cycle of the second clock signal.

Optionally, the method shown in flowchart 700 may further include enabling a latch configured to latch the first clock signal. For example, latches 502 and 504 are enabled by iFF Reset signal as shown in FIG. 5. The enabling may be performed responsive, at least in part, to an active data clock signal provided by a controller, an access command provided by the controller, or a combination thereof. Optionally, the method shown in flowchart 700 may include disabling a latch configured to latch the first clock signal. The disabling may be performed responsive, at least in part, to an inactive data clock signals provided by a controller, completion of an access operation by a memory, or a combination thereof.

Although blocks 702-710 are shown as occurring in series, some or all of the blocks 702-710 may be performed, at least in part, concurrently and/or in a different order. For example, in some embodiments, latching responsive to the second edge may occur prior to latching responsive to the first edge. In another example, providing the first and second outputs may occur concurrently, at least in part.

Memories that include clock generator circuits as disclosed herein may generate internal clock signals from a clock signal responsive to another clock signal. For example, a clock generator circuit may sample one or more clock signals to generate the internal clock signals. The sampling may be responsive to one or more other clock signals. By generating the internal clock signals based on one clock signal responsive to another clock signal, in some applications, a need for the two clock signals to be synchronized may be reduced or eliminated. Thus, the clock generator circuit may reduce or eliminate the need for synchronization operations in some applications. By reducing or eliminating synchronization operations, the memory may have reduced delays prior to execution of an access operation in some applications. Furthermore, techniques for generating the internal clock signals according to the embodiments disclosed herein, such as by latching, the clock generator circuit need not include a clock divider. In some applications, not including the clock divider may allow a controller to provide one or more clock signals at a single rate rather than multiple rates.

From the foregoing it will be appreciated that, although specific embodiments of the disclosure have been described herein for purposes of illustration, various modifications may be made without deviating from the spirit and scope of the disclosure. Accordingly, the scope disclosure should not be limited any of the specific embodiments described herein.

What is claimed is:

1. An apparatus comprising:
    a memory array;
    a decoder coupled to a command address bus for the memory array; and
    peripheral circuitry coupled to the decoder and comprising:
        a first latch configured to latch a state of a first clock signal responsive to a first edge of a second clock signal and provide a first output and a second output, wherein the first output and the second output are complementary; and
        a second latch configured to latch the state of the first clock signal responsive to a second edge of the second clock signal and provide a third output and a fourth output, wherein the third output and the fourth output are complementary.

2. The apparatus of claim 1, further comprising a delay circuit configured to delay the first clock signal provided to the second latch.

3. The apparatus of claim 2, wherein the delay circuit delays the first clock signal by one half of a clock cycle of the second clock signal.

4. The apparatus of claim 1, further comprising an inverter configured to invert the second clock signal provided to the second latch.

5. The apparatus of claim 1, wherein the first latch, the second latch, or both comprise a D flip-flop.

6. The apparatus of claim 1, wherein the first edge comprises a rising edge and the second edge comprises a falling edge.

7. The apparatus of claim 1, wherein the first clock signal is an internal system clock signal and the second clock signal is an internal data clock signal.

8. The apparatus of claim 1, wherein the first, second, third, and fourth outputs comprise quadrature phase clock signals.

9. The apparatus of claim 1, wherein the second clock signal has a frequency twice a frequency of the first clock signal.

10. The apparatus of claim 1, wherein the first latch and the second latch are further configured to receive a reset signal, and the first latch and the second latch are enabled and disabled based, at least in part, on a state of the reset signal.

11. A method comprising:
    latching a first clock signal responsive, at least in part, to a first edge of a second clock signal;
    providing a first output based on the latching responsive to the first edge;
    latching the first clock signal responsive, at least in part, to a second edge of the second clock signal; and
    providing a second output based on the latching responsive to the second edge.

12. The method of claim 11, further comprising delaying the first clock signal latched responsive to the second edge of the second clock signal.

13. The method of claim 12, wherein the delaying comprises delaying the first clock signal latched responsive to the second edge of the second clock signal is half a clock cycle of the second clock signal.

14. The method of claim 11, wherein the first output comprises a first pair of complementary clock signals and the second output comprises a second pair of complementary clock signals.

15. The method of claim 14, wherein the first pair and second pair of complementary clock signals comprise a quadrature phase clock signals.

16. The method of claim 11, wherein the first clock signal comprises a system clock signal and the second clock signal is a data clock signal.

17. The method of claim 11, wherein a frequency of the second clock signal is double a frequency of the first clock signal.

18. The method of claim 11, further comprising enabling a latch configured to latch the first clock signal.

19. The method of claim 18, wherein enabling is performed responsive, at least in part, to an active data clock signal provided by a controller, an access command provided by the controller, or a combination thereof.

20. The method of claim 11, further comprising disabling a latch configured to latch the first clock signal.

21. The method of claim 20, wherein disabling is performed responsive, at least in part, to an inactive data clock signals provided by a controller, completion of an access operation by a memory, or a combination thereof.

* * * * *